United States Patent

[11] 3,632,279

[72] Inventors Raymond L. Christy;
Paul D. Uhlenhaut, both of Akron, Ohio
[21] Appl. No. 836,074
[22] Filed June 24, 1969
[45] Patented Jan. 4, 1972
[73] Assignee NRM Corporation
Akron, Ohio

[54] EXTRUDER DIE CLAMP
10 Claims, 6 Drawing Figs.
[52] U.S. Cl................................................. 425/450,
269/201
[51] Int. Cl...................................................... B29f 3/00
[50] Field of Search.......................................... 18/12 DH,
12 DM, 12 DS; 146/174; 269/201, 228, 287, 288

[56] References Cited
UNITED STATES PATENTS
2,057,043 10/1936 Meehan......................... 146/174
2,846,968 8/1958 Tipton.......................... 269/201

*Primary Examiner*—J. Spencer Overholser
*Assistant Examiner*—Lucius R. Frye
*Attorney*—Oberlin, Maky, Donnelly & Renner ABSTRACT: An extruder die clamp having arcuate clamping members engageable with oppositely tapered flanges on a die adapter and on the end of an extruder cylinder thus to form a fluidtight joint around the registering extruder and adapter openings. The clamp has parallel pivots at one end of the clamping members which are adjustable toward or away from each other to adjust clamping pressure when the toggle linkage at the other end of said members is actuated to clamping position, and has an equalizer link associated with the toggle linkage to maintain substantial symmetry of the clamping members as the clamp is opened. Also, the clamp is mounted on the extruder so that it may float radially for self-centering action and axially as the clamping members are drawn together against the beveled flanges of the die adapter and the extruder.

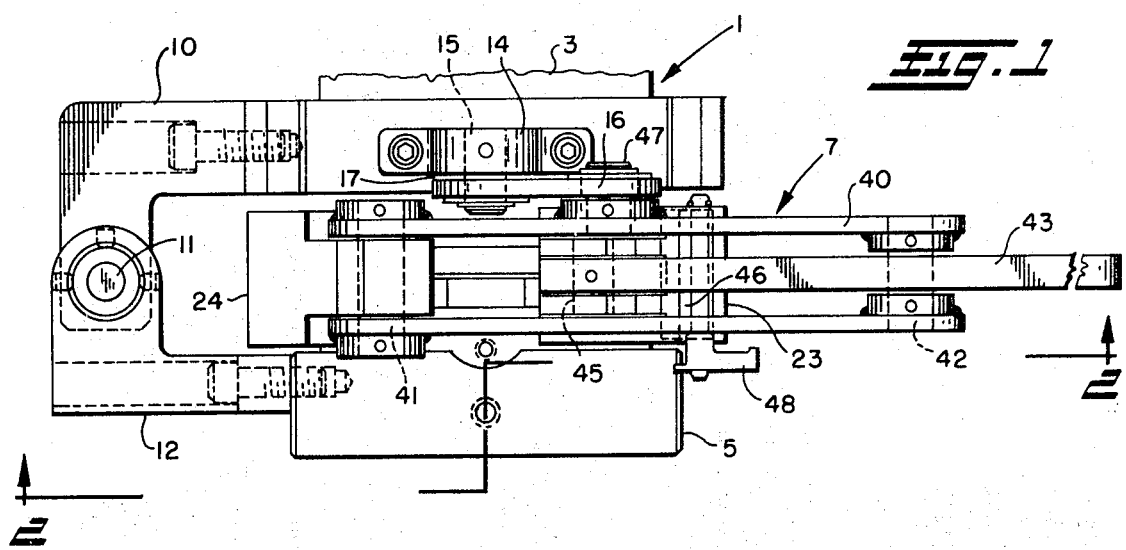
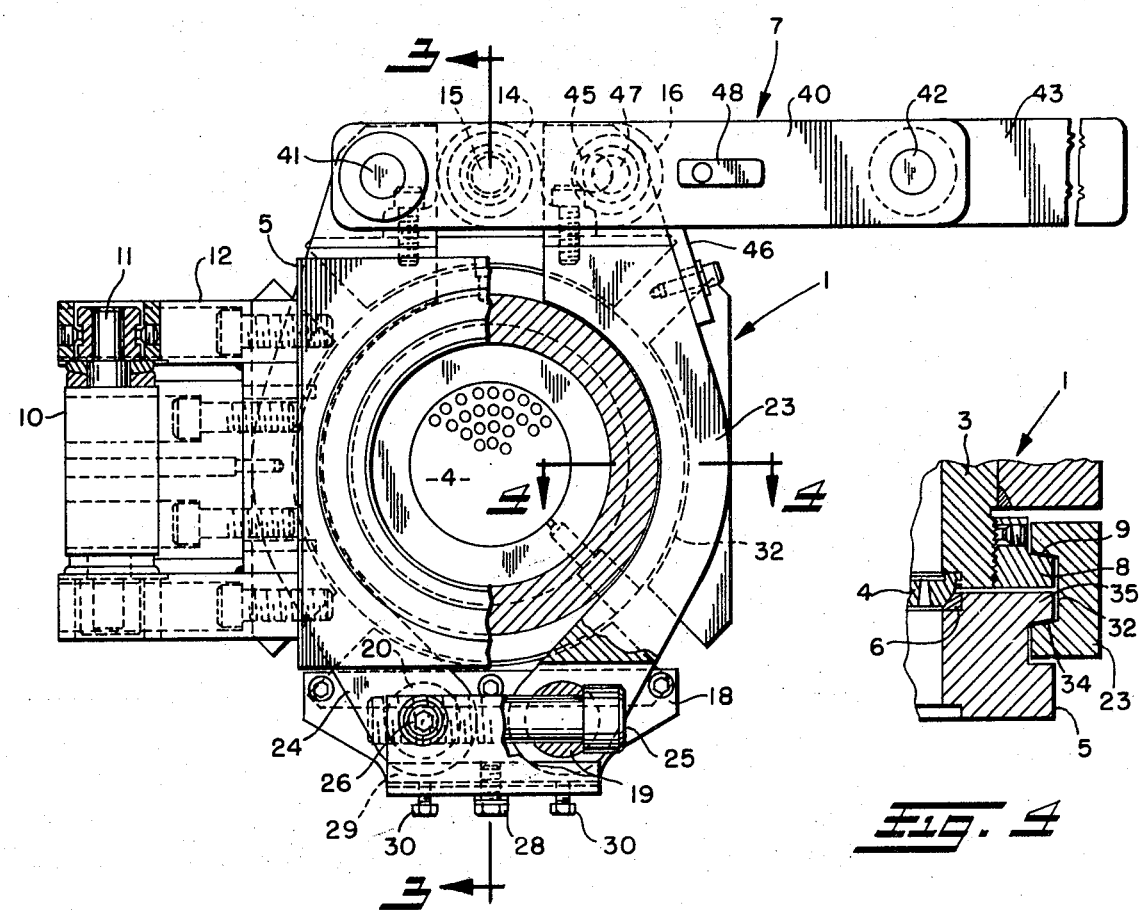

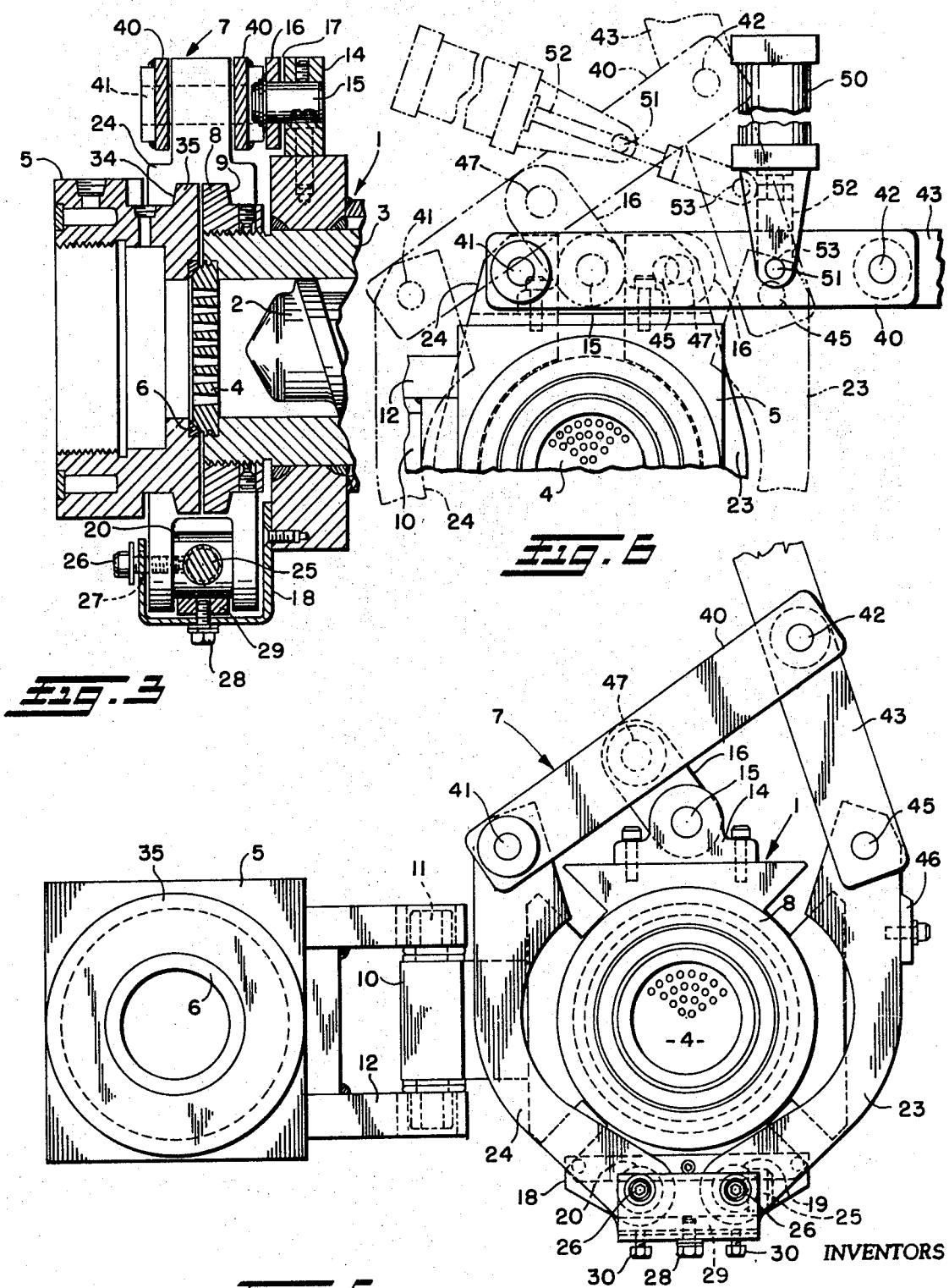

EXTRUDER DIE CLAMP

BACKGROUND OF THE INVENTION

It is known to provide extruder die clamps which comprise arcuate clamping members which are moved toward and away from each other for clamping and releasing a die adapter to and from an extruder, the die adapter being mounted for swinging away from the extruder to provide ready access to the die and to the extruder head for cleaning or other service.

It is known to provide a loose-fitting hinge connection between the clamping members to achieve self-centering action of the clamp when closed, but this requires the provision of an adjustable toggle linkage for adjustment of the clamping force.

SUMMARY OF THE INVENTION

Contrary to the foregoing, the extruder die clamp herein is mounted on the extruder for radial and axial floating movement for self-centering action and for drawing the die adapter flange toward the extruder flange, and the clamping members are actuated by a simple toggle linkage associated with one end of the clamping members while the other end of the clamping members have pivots which are adjustable toward or away from each other thus to adjust clamping pressure when the toggle linkage is in locking position.

Accordingly, it is one principal object of this invention to provide a simple and efficient form of floating extruder die clamp which may easily be adapted for power operation.

Another object of this invention is to provide an extruder die clamp which, by means of a single equalizer link pivotally connected to the extruder and to one of the toggle links of the clamp, opens the clamping members equal amounts.

BRIEF DESCRIPTION OF THE DRAWINGS

FIG. 1 is a top plan view of an extruder die clamp constituting the present invention;

FIG. 2 is a partial front elevation view and cross section view taken substantially along the line 2—2, FIG. 1;

FIGS. 3 and 4 are cross section views taken substantially along the lines 3—3, and 4—4, of FIG. 2;

FIG. 5 is a front elevation view illustrating the clamp in open position and showing the die adapter swung out of the way for servicing of the die therein and exposing the head end of the extruder for cleaning or other service; and FIG. 6 illustrates an extruder die clamp arranged for power operation.

DESCRIPTION OF THE INVENTION

Referring now in detail to the drawings, the reference numeral 1 denotes the head end of an extruder wherein a feed screw 2 rotatable in the cylinder 3 delivers plasticized material through the breaker or strainer plate 4 and through a die (not shown) mounted in the die adapter 5, the die adapter 5 having a hardened steel or like seat insert 6 therein which has a frustoconical seat adapted to engage a corresponding seat in the breaker plate 4, thus to form a fluidtight joint when the die adapter 5 is drawn tightly toward the end of the extruder 1 by the clamp 7 to be presently described.

The end of the cylinder 3 has threaded thereon a flange 8 having a beveled rear face 9 and as evident, the axial position of the flange 8 may be adjusted by rotating the same on the cylinder 3 and locking it in desired adjusted position as by means of setscrews. Bolted to one side of the cylinder 3 is a hinge bracket 10 which carries a hinge pin 11 on which the hinge bracket 12 of the die adapter 5 is mounted for swinging movement about a vertical axis as best shown in FIG. 5. Mounted on the top of cylinder 3 is a bracket 14 having axially adjustably secured therein a pin 15 on which the equalizer link 16 is pivotally mounted, there being an axial clearance 17 (see FIG. 3) to permit axial float of the upper portion of the clamp 7. Secured to the lower portion of the cylinder 3 is a U-shaped support member 18 embracing the pivots 19 and 20 for the lower ends of a pair of arcuate clamping members 23 and 24. Extending through the pivot 19 is an adjusting screw 25 which has threaded engagement with the other pivot 20, whereby when the screw 25 is turned in one direction or the other the pivots 19 and 20 are moved closer together or farther apart. Locking of the adjusting screw 25 to hold pivots 19 and 20 in adjusted position and leave them free to rotate is effected as by screws 26 which are threaded into pivots 19 and 20 to engage screw 25 and which extend loosely through openings 27 in the front side of said U-shaped support member 18 so that radial and axial floating action of the clamp 7 is permitted.

The bottom of the U-shaped support member 18 has a screw 28 extending loosely therethrough in threaded engagement with a clamp support bar 29 which is vertically, longitudinally, and laterally adjustably disposed beneath the pivots 19 and 20 and which loosely fits between the bifurcated lower portions of the clamping members 23 and 24. Other screws 30 in threaded engagement with the support member 18 are engaged with the bar 29. By manipulating the screws 28 and 30, the bar 29 may be raised or lowered or otherwise shifted. When the clamp 7 is opened as in FIG. 5, it is supported by the pivots 19 and 20 resting on the bar 29 and the side clearances between said bar 29 and the clamping members 23 and 24 enables axial floating action of the lower ends. When the clamp 7 is closed the pivots 19 and 20 may lift away from bar 29 for self-centering action of the clamp 7.

Each clamping member 23 and 24 has an internal groove 32 therein, the sides of which are oppositely beveled the same as the rear beveled face 9 of flange 8 and the front beveled face 34 of the die adapter flange 35.

The toggle linkage for effecting clamping and unclamping action comprises a first link 40 which is pivotally mounted at 41 to clamping member 24, and at 42 to a second link 43 (operating lever) which is pivotally mounted at 45 to the clamping member 23 in such manner that in the locked position as determined by the adjustable plate 46 the three pivots 41, 45, and 42 are in dead center position or the pivot or knee joint 42 may be slightly below a line drawn through the other two pivots 41 and 45. The equalizer link 16 is pivotally connected at 47 to said first link 40. The toggle linkage 40–43 is held in locked position against inadvertent unlocking as by means of the pin 48 which passes through registering holes in said first and second links 40 and 43. When it is desired to open the clamp 7, the pin 48 is first withdrawn, whereupon the operating link 43 may be swung upwardly to the FIG. 5 position which effects opening movement of the clamping members 23 and 24 about their lower pivots 19 and 20. By reason of the provision of the equalizer link 16, the clamping members 23 and 24 are symmetrical when they are in their open position as shown in FIG. 5.

As evident from the foregoing description, the setting of the flange 8 on cylinder 3 influences the clamping force when the toggle linkage 40–43 is in the locking position and, of course, the turning of the screw 25 effects increase or decrease in clamping force as desired.

As shown in FIG. 6, if power operation is desired, a cylinder 50 may be pivotally mounted at 51 to the link 40 and the piston rod 52 of said cylinder 50 may be pivotally connected at 53 to the link 43. Accordingly, when fluid (air or oil) under pressure is admitted into the head end of cylinder 50, the piston rod 52 will be extended to open the clamp 7 as shown in phantom lines in FIG. 6.

We, therefore, particularly point out and distinctly claim as our invention:

1. An extruder die clamp for releasably clamping together a die adapter and an extruder having adjacent beveled flanges; said clamp comprising a pair of arcuate clamping members; a pivot member providing spaced apart pivots for one end of said clamping members; and a toggle linkage including first and second links pivotally connected together to form a knee joint and to the other end of the respective clamping members, said toggle linkage, when actuated, being operative to swing said clamping members toward each other into engagement with said beveled flanges to clamp said die adapter and extruder together; said pivot member having means for adjusting the spacing of the pivots thereof, thus to vary the clamping force exerted on said flanges.

2. The clamp of claim 1 wherein said clamping members have an internal circumferentially extending groove with beveled sides to embrace said beveled flanges to draw them axially together when said clamping members are swung toward each other.

3. The clamp of claim 1 wherein said pivot member comprises a screw extending diametrically through one pivot with its head abutting said one pivot and having threaded engagement with the other pivot whereby upon rotation of said screw said pivots may be adjusted toward or away from each other.

4. The clamp of claim 1 wherein said clamp is vertically disposed with said pivot member having horizontal pivots for the lower end of said clamping members; and wherein fixed support means beneath said pivot member supports said clamp when said clamping members are swung away from each other out of engagement with said beveled flanges; said pivot member and clamping members being vertically, laterally, and axially movable with respect to said support means when said clamping members are moved to clamping position thus to allow self-centering of said clamp with respect to said flanges.

5. The clamp of claim 1 wherein a piston-cylinder assembly has its piston rod and the adjacent end of said cylinder pivotally connected to the respective links whereby said clamp may be opened and closed by fluid-pressure actuation of said assembly.

6. An extruder having, at its delivery end, hinge means, a flange with a beveled rear face, and a die clamp support means; a die adapter mounted on said hinge means for swinging movement toward and away from said extruder and having a flange, which when said die adapter is swung toward said extruder has a beveled front face; and a clamp supported on said support means actuatable from an open position whereat said die adapter may be swung away from said extruder to a closed position whereat said die adapter after being swung toward said extruder, is clamped against said extruder; said clamp comprising a pair of arcuate clamping members; a pivot member providing spaced apart pivots for one end of said clamping members; and a toggle linkage including first and second links pivotally connected together to form a knee joint and to the other end of the respective clamping members, said toggle linkage, when actuated, being operative to swing said clamping members toward each other into engagement with said beveled flanges to clamp said die adapter and extruder together; said clamp, when in open position, resting upon said support means and, when in closed position, being disengageable from said support, to allow self-centering of said clamp with respect to said flanges; said support means including an equalizer link which is pivotally connected to said extruder and to one of the links of said toggle linkage and which is operative to swing said clamping members equal amounts in the open position of said clamp.

7. An extruder having, at its delivery end, hinge means, a flange with a beveled rear face, and a die clamp support means; a die adapter mounted on said hinge means for swinging movement toward and away from said extruder and having a flange, which when said die adapter is swung toward said extruder has a beveled front face; and a clamp supported on said support means actuatable from an open position whereat said die adapter may be swung away from said extruder to a closed position whereat said die adapter after being swung toward said extruder, is clamped against said extruder; said clamp comprising a pair of arcuate clamping members; a pivot member providing spaced apart pivots for one end of said clamping members; and a toggle linkage including first and second links pivotally connected together to from a knee joint and to the other end of the respective clamping members, said toggle linkage, when actuated, being operative to swing said clamping members toward each other into engagement with said beveled flanges to clamp said die adapter and extruder together; said clamp, when in open position, resting upon said support means and, when in closed position, being disengageable from said support, to allow self-centering of said clamp with respect to said flanges; said pivot member having means for adjusting the spacing of the pivots thereof, thus to vary the clamping force exerted on said flanges.

8. An extruder having, at its delivery end, hinge means, a flange with a beveled rear face, and a die clamp support means; a die adapter mounted on said hinge means for swinging movement toward and away from said extruder and having a flange, which when said die adapter is swung toward said extruder has a beveled front face; and a clamp supported on said support means actuatable from an open position whereat said die adapter may be swung away from said extruder to a closed position whereat said die adapter after being swung toward said extruder, is clamped against said extruder; said clamp comprising a pair of arcuate clamping members; a pivot member providing spaced apart pivots for one end of said clamping members; and a toggle linkage including first and second links pivotally connected together to form a knee joint and to the other end of the respective clamping members, said toggle linkage, when actuated, being operative to swing said clamping members toward each other into engagement with said beveled flanges to clamp said die adapter and extruder together; said clamp, when in open position, resting upon said support means and, when in closed position, being disengageable from said support, to allow self-centering of said clamp with respect to said flanges; said clamping members having an internal circumferentially extending groove with beveled sides to embrace said beveled flanges to draw them axially together when said clamping members are swung toward each other.

9. An extruder having, at its delivery end, hinge means, a flange with a beveled rear face, and a die clamp support means; a die adapter mounted on said hinge means for swinging movement toward and away from said extruder and having a flange, which when said die adapter is swung toward said extruder has a beveled front face; and a clamp supported on said support means actuatable from an open position whereat said die adapter may be swung away from said extruder to a closed position whereat said die adapter after being swung toward said extruder, is clamped against said extruder; said clamp comprising a pair of arcuate clamping members; a pivot member providing spaced apart pivots for one end of said clamping members; and a toggle linkage including first and second links pivotally connected together to form a knee joint and to the other end of the respective clamping members, said toggle linkage, when actuated, being operative to swing said clamping members toward each other into engagement with said beveled flanges to clamp said die adapter and extruder together; said clamp, when in open position, resting upon said support means and, when in closed position, being disengageable from said support, to allow self-centering of said clamp with respect to said flanges; said pivot member comprising a screw extending diametrically through one pivot with its head abutting said one pivot and having threaded engagement with the other pivot whereby upon rotation of said screw said pivots may be adjusted toward or away from each other.

10. An extruder having, at its delivery end, hinge means, a flange with a beveled rear face, and a die clamp support means; a die adapter mounted on s aid hinge means for swinging movement toward and away from said extruder and having a flange, which when said die adapter is swung toward said extruder has a beveled front face; and a clamp supported on said support means actuable from an open position whereat said die adapter may be swung away from said extruder to a closed position whereat said die adapter after being swung toward said extruder, is clamped against said extruder; said clamp comprising a pair of arcuate clamping members; a pivot member providing spaced apart pivots for one end of said clamping members; and a toggle linkage including first and second links pivotally connected together to form a knee joint and to the other end of the respective clamping members, said toggle linkage, when actuated, being operative to swing said clamping members toward each other into engagement with said beveled flanges to clamp said die adapter and extruder together; said clamp, when in open position, resting upon said support means and, when in closed position, being disengageable from said support, to allow self-centering of said clamp with respect to said flanges; said first and second links being in substantially horizontal position when said clamp is closed; and said support means including an equalizer link which is pivotally connected to said extruder between such other ends of said clamping members and to one of said links, and is in substantially horizontal position when said clamp is closed.

* * * * *